United States Patent
Long, II et al.

(10) Patent No.: US 10,896,492 B2
(45) Date of Patent: Jan. 19, 2021

(54) COGNITIVE LOAD REDUCING PLATFORM HAVING IMAGE EDGE ENHANCEMENT

(71) Applicant: QWAKE TECHNOLOGIES, LLC, San Francisco, CA (US)

(72) Inventors: John Davis Long, II, New York, NY (US); Omer Haciomeroglu, San Francisco, CA (US)

(73) Assignee: QWAKE TECHNOLOGIES, LLC, San Francisco, CA (US)

(*) Notice: Subject to any disclaimer, the term of this patent is extended or adjusted under 35 U.S.C. 154(b) by 0 days.

(21) Appl. No.: 16/383,158

(22) Filed: Apr. 12, 2019

(65) Prior Publication Data
US 2020/0151859 A1    May 14, 2020

Related U.S. Application Data

(60) Provisional application No. 62/758,457, filed on Nov. 9, 2018.

(51) Int. Cl.
*H04N 5/33* (2006.01)
*G06T 5/00* (2006.01)
(Continued)

(52) U.S. Cl.
CPC .............. *G06T 5/009* (2013.01); *G06T 5/40* (2013.01); *H04N 5/33* (2013.01);
(Continued)

(58) Field of Classification Search
CPC ........ G06K 9/3241; G06K 9/325; G06T 3/40; G06T 5/009; G06T 5/40;
(Continued)

(56) References Cited

U.S. PATENT DOCUMENTS 5,778,092 A    7/1998 MacLeod
6,195,467 B1    2/2001 Asimopoulos
(Continued)

FOREIGN PATENT DOCUMENTS

EP    1168033 A1    1/2002
EP    1659890 B1    1/2009
(Continued)

OTHER PUBLICATIONS

Georgy Gimel'farb, "Part 3: Image Processing Digital Images and Intensity Histogram", Jun. 4, 2014 (Year: 2014).*
(Continued)

*Primary Examiner* — Albert Kir
(74) *Attorney, Agent, or Firm* — Schwabe Williamson & Wyatt, PC

(57) ABSTRACT

Enhancing edges of objects in a thermal image comprises receiving a thermal image and generating a gradient magnitude image comprising a plurality of pixels having associated gradient magnitude values. The gradient magnitude image is partitioned into subregions and gradient magnitude statistics are calculated for each. Mapping parameters are calculated for each of the subregions that equalize and smooth a dynamic range of the corresponding gradient magnitude statistics across the subregions. The mapping parameters calculated for each of the subregions are applied to pixels in the subregions to generate enhanced gradient magnitude values having equalized luminosity and contrast, and a wireframe image is formed therefrom having enhanced edges of objects. The wireframe image is displayed on a display device, wherein the wireframe image appears as a decluttered line drawing where the enhanced edges have increased luminosity and contrast compared to the thermal image to reduce the cognitive load of the user.

21 Claims, 10 Drawing Sheets

(51) Int. Cl.
  *G06T 7/13*  (2017.01)
  *G06T 5/40*  (2006.01)
(52) U.S. Cl.
  CPC .............. *G06T 2207/10048* (2013.01); *G06T 2207/20021* (2013.01); *G06T 2207/20192* (2013.01)
(58) Field of Classification Search
  CPC . G06T 2207/10048; G06T 2207/20021; G06T 2207/20192; H04N 5/33; H04N 5/225
  USPC .................. 348/94, 158, 373, 164; 345/428; 382/105
  See application file for complete search history.

(56) References Cited

U.S. PATENT DOCUMENTS

| | | | |
|---|---|---|---|
| 6,611,618 B1 | 8/2003 | Peli | |
| 6,891,966 B2 | 5/2005 | Chen | |
| 6,898,559 B2 | 5/2005 | Saitta | |
| 6,909,539 B2 | 6/2005 | Korniski | |
| 7,085,401 B2 | 8/2006 | Averbuch | |
| 7,190,832 B2 | 3/2007 | Frost | |
| 7,369,174 B2* | 5/2008 | Olita | A42B 3/042 348/373 |
| 7,377,835 B2 | 5/2008 | Parkulo | |
| 7,430,303 B2* | 9/2008 | Sefcik | G06K 9/3241 348/94 |
| 7,460,304 B1 | 12/2008 | Epstein | |
| 7,598,856 B1 | 10/2009 | Nick | |
| 8,054,170 B1 | 11/2011 | Brandt | |
| 8,358,307 B2* | 1/2013 | Shiomi | G06T 3/40 345/428 |
| 8,463,006 B2 | 6/2013 | Prokoski | |
| 8,836,793 B1 | 9/2014 | Kriesel | |
| 9,177,204 B1 | 11/2015 | Tiana | |
| 9,498,013 B2 | 11/2016 | Handshaw | |
| 9,728,006 B2 | 8/2017 | Varga | |
| 9,729,767 B2 | 8/2017 | Longbotham | |
| 9,875,430 B1 | 1/2018 | Keisler | |
| 9,995,936 B1 | 6/2018 | Macannuco | |
| 9,998,687 B2 | 6/2018 | Lavoie | |
| 10,042,164 B2 | 8/2018 | Kuutti | |
| 10,089,547 B2 | 10/2018 | Shemesh | |
| 10,417,497 B1 | 9/2019 | Cossman | |
| 2003/0190090 A1 | 10/2003 | Beeman | |
| 2006/0023966 A1 | 2/2006 | Vining | |
| 2007/0257934 A1 | 11/2007 | Doermann | |
| 2008/0092043 A1 | 4/2008 | Trethewey | |
| 2008/0146334 A1 | 6/2008 | Kil | |
| 2011/0135156 A1* | 6/2011 | Chen | G06K 9/325 382/105 |
| 2011/0262053 A1 | 10/2011 | Strandemar | |
| 2013/0307875 A1 | 11/2013 | Anderson | |
| 2015/0025917 A1 | 1/2015 | Stempora | |
| 2015/0067513 A1 | 3/2015 | Zambetti | |
| 2015/0163345 A1 | 6/2015 | Cornaby | |
| 2015/0202962 A1 | 7/2015 | Habashima | |
| 2015/0244946 A1 | 8/2015 | Againn | |
| 2015/0302654 A1 | 10/2015 | Arbouzov | |
| 2015/0324989 A1 | 11/2015 | Smith | |
| 2015/0334315 A1 | 11/2015 | Teich | |
| 2015/0338915 A1 | 11/2015 | Publicover | |
| 2015/0339570 A1 | 11/2015 | Scheffler | |
| 2016/0260261 A1 | 9/2016 | Hsu | |
| 2016/0295208 A1 | 10/2016 | Beall | |
| 2016/0350906 A1 | 12/2016 | Meier | |
| 2016/0360382 A1 | 12/2016 | Gross | |
| 2017/0061663 A1 | 3/2017 | Johnson | |
| 2017/0123211 A1 | 5/2017 | Lavoie | |
| 2017/0192091 A1 | 7/2017 | Felix | |
| 2017/0224990 A1 | 8/2017 | Goldwasser | |
| 2017/0251985 A1 | 9/2017 | Howard | |
| 2018/0165978 A1 | 6/2018 | Wood | |
| 2018/0189957 A1 | 7/2018 | Sanchez Bermudez | |
| 2018/0241929 A1 | 8/2018 | Bouzaraa | |

FOREIGN PATENT DOCUMENTS

| | | |
|---|---|---|
| WO | 2017/130184 A1 | 8/2017 |
| WO | 2018/167771 A1 | 9/2018 |

OTHER PUBLICATIONS

Omer Haciomeroglu, "C-Thru Smoke Diving Helmet", Apr. 29, 2014, (Year: 2014).*
Bretschneider et al., "Head Mounted Displays for Fire Fighters" 3rd International Forum on Applied Wearable Computing 2006; 15 pages.
Chen, "Reducing Cognitive Load in Mobile Learning: Activity-centered Perspectives" Published in International Conference on Networking and Digital Society; DOI: 10.1109/ICNDS.2010.5479459; pp. 504-507 (2010).
Fan, et al., "Reducing Cognitive Overload by Meta-Learning Assisted Algorithm Selection" Published in 5th IEEE International Conference on Cognitive Informatics; DOI: 10.1109/COGINF.2006.365686; pp. 120-125 (2006).
Gimel'Farb Part 3: Image Processing, Digital Images and Intensity Histograms; COMPSCI 373 Computer Graphics and Image Processing; University of Auckland, Auckland, NZ; Date unknown; 57 pages.
Haciomeroglu, "C-thru smoke diving helmet" Jan. 8, 2013; 15 pages; behance.com <http://ww.behance.net/gallery/6579685/C-Thru-Smoke-Diving-Helmet>.
Haciomeroglu, "C-thru smoke diving helmet" Jan. 8, 2013, 14 pages; coroflot.com <https://www.coroflot.com/OmerHaciomeroglu/C-Thru-smoke-Diving-Helmet>.
Mckinzie, "Fire Engineering: The Future of Artificial Intelligence in Firefighting" Oct. 25, 2018; available at <https://www.fireengineering.com/articles/2018/10/artificial-intelligence-firefighting.html>; 16 pages.
Reis, et al., "Towards Reducing Cognitive Load and Enhancing Usability Through a Reduced Graphical User Interface for a Dynamic Geometry System: An Experimental Study" Proceedings—2012 IEEE International Symposium on Multimedia, ISM 2012. 445-450. 10.1109/ISM.2012.91; pp. 445-450 (2012).
Thomsen-Florenus, "Thermal Vision System" Berlin, Germany; Dec. 2017; 7 pages.
Wu et al., "Contract-Accumulated Histogram Equalization for Image Enhancement", IEEE SigPort, 2017. [Online]. Available at <http://sigport.org/1837>.
Wu, "Feature-based Image Segmentation, Texture Synthesis and Hierarchical Visual Data Approximation" University of Illinois at Urbana-Champaign, Apr. 2006; 61 pages.
Khan et al., "Tracking Visual and Infrared Objects using Joint Riemannian Manifold Appearance and Affine Shaping Modeling" Dept. of Signals and Systems, Chalmers University of Technology, Gothenburg, 41296, Sweden; IEEE International Conference on Computer Vision Workshop (2011); pp. 1847-1854.
Patent Cooperation Treaty: International Search Report and Written Opinion for PCT/US2019/058635 dated Jan. 15, 2020; 14 pages.

* cited by examiner

FIG. 3A  FIG. 3B
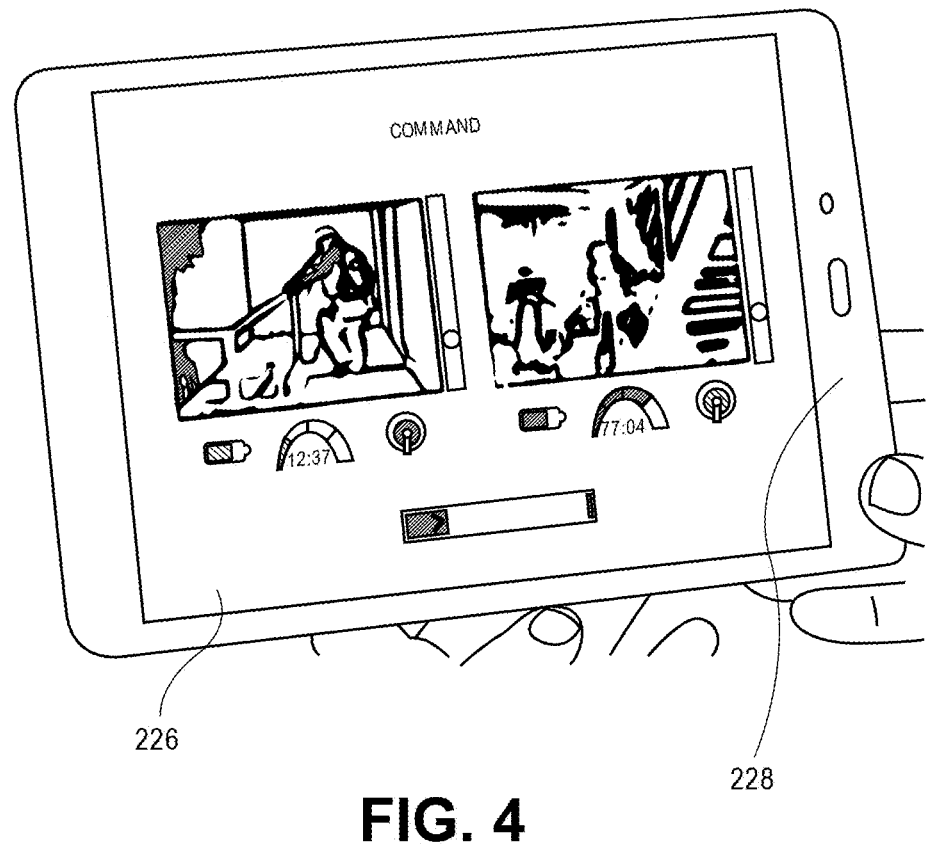
FIG. 4

COGNITIVE LOAD REDUCING PLATFORM HAVING IMAGE EDGE ENHANCEMENT

CROSS-REFERENCE TO RELATED APPLICATION

This application claims the benefit of provisional Patent Application Ser. No. 62/758,457, filed Nov. 9, 2018, assigned to the assignee of the present application, and incorporated herein by reference.

BACKGROUND

In high stress and oftentimes hazardous work environments-including firefighting, search & rescue, oil and gas, surgery, fighter pilots, mining, special ops, and the like, one false step has critical consequences, but so do too many slow steps. Go too fast and something life-threatening may be missed; go too slow and the results could be doubly devastating. The challenges of effectively and safely performing critical work in harsh and obscured environments have always existed. These challenges combine the physical strain imposed by hazardous terrain with the mental distress placed upon the individual operating within them. Critical human performance in high-stress environments is limited by how rapidly and effectively the brain can process impoverished or jumbled sensory inputs. Until now technology has been leveraged primarily to increase the amount of information provided to the senses, but not designed to specifically enhance the brain's existing (and unmatched) cognitive ability to make sense of that information.

For example, several emergency response systems are centered on the use of thermal imaging cameras (TICs) and augmented reality (AR) optics to provide a hands-free thermal display to the user. Current systems are typically carried by a crewmember who must iteratively scan, mentally process and communicate what they perceive. Current handheld and hands-free TICs lack the computational resources and software required to unobtrusively offer advanced image processing and data visualization features to all crewmembers in real-time. This capability and time gap in the visual understanding of hazardous environments has been identified as a significant causative factor in responder line of duty deaths. Such systems cause crewmembers, such as first responders, to operate in a Stop, Look, Process and Remember paradigm, which is cumbersome and time consuming.

Accordingly, there is a need for improved methods and systems for effectively for providing information to the senses of first responders operating in high-stress environments in a manner that reduces cognitive load to enhance performance.

BRIEF SUMMARY

The exemplary embodiment provides a cognitive load reducing platform for first responders that incorporates contextual and physiological visualizations delivered via electronic communications designed to reduce cognitive load and elevate performance. Aspects of the cognitive load reducing platform include enhancing edges of objects in a thermal image by receiving a thermal image and generating a gradient magnitude image comprising a plurality of pixels having associated gradient magnitude values. The gradient magnitude image is partitioned into subregions and gradient magnitude statistics are calculated for each. Mapping parameters are calculated for each of the subregions that equalize and smooth a dynamic range of the corresponding gradient magnitude statistics across the subregions. The mapping parameters calculated for each of the subregions are applied to pixels in the subregions to generate enhanced gradient magnitude values having equalized luminosity and contrast, and a wireframe image is formed therefrom having enhanced edges of objects. The wireframe image is displayed on a display device, wherein the wireframe image appears as a decluttered line drawing where the enhanced edges have increased luminosity and contrast compared to the thermal image to reduce the cognitive load of the user.

According to the method and system disclosed herein, the cognitive load reducing platform changes first responders' use of these technologies from the cumbersome, and information overloaded, Stop, Look, Process and Remember paradigm to a state of continuous assisted perception for all crewmembers.

BRIEF DESCRIPTION OF SEVERAL VIEWS OF THE DRAWINGS

FIGS. 3A and 3B are diagrams illustrating an example of the enhanced images displayed on the display unit.

FIG. 4 is a diagram illustrating an example command and control interface of the cognitive load reducing platform.

DETAILED DESCRIPTION

Figure 1:
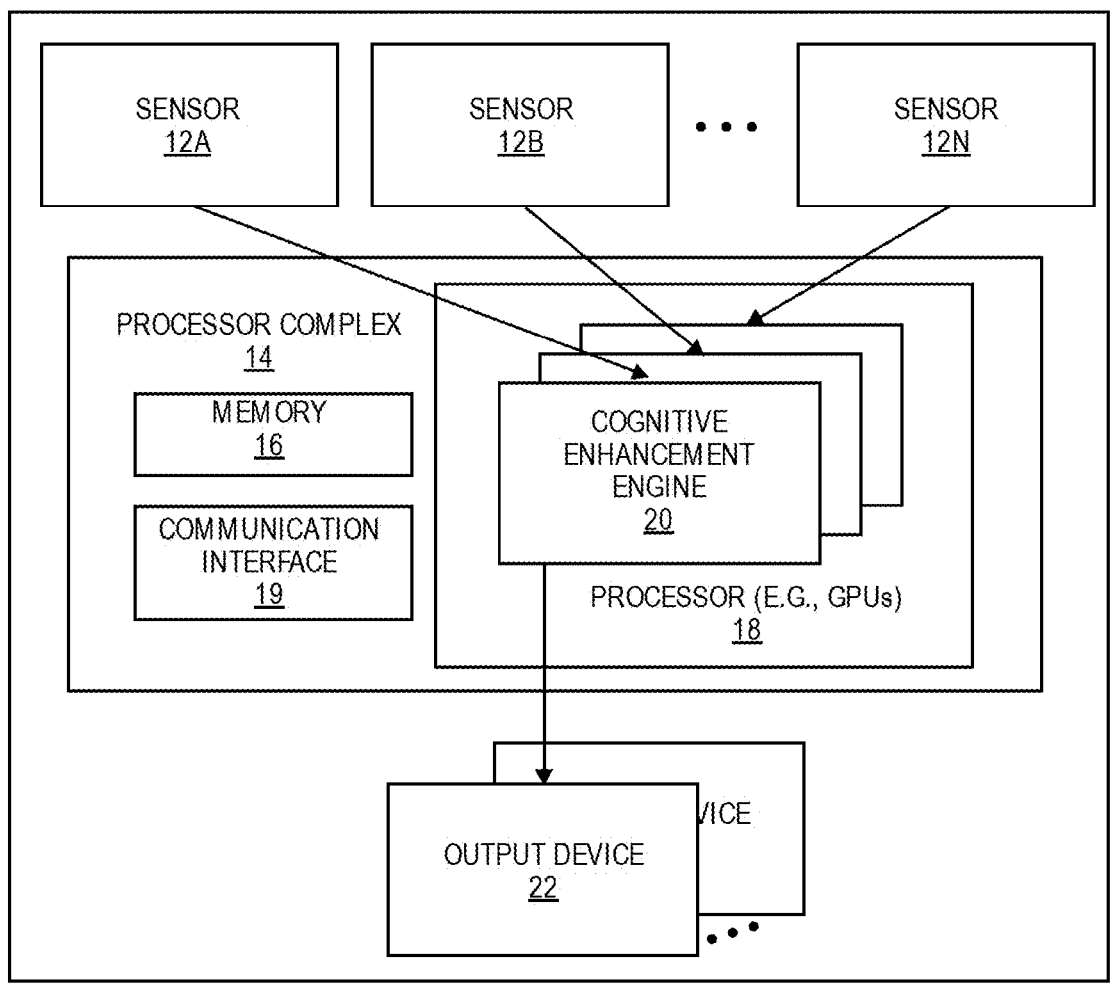
FIG. 1 is a diagram illustrating one embodiment of a cognitive load reducing platform according to one embodiment.

The exemplary embodiment relates to methods and systems for incorporating contextual and physiological visualizations into electronic communications via a cognitive load reducing platform having image edge enhancement. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

In many critical, high-stress activities, such as firefighting, specialized tools have been developed to support challenging environments and critical objectives of crewmembers engaged in the high-stress activities. For the most part, these tools have evolved to support the crewmembers' physical needs—heat protection, airway protection, forcible entry, fire suppression, and the like. In the past 10-15 years, a greater focus has been placed on supporting the crewmembers' informational needs, including hazardous environment detection, communication, and safety alerting. For example, hearing aids, binoculars, and seismic sensors all increase the collection of information, but don't increase crewmembers' abilities to process or critically discern that extra information. Polarized glasses, gas monitors, thermal imagers, and the like all collect information, but still do not address the time and stress penalty required to absorb and interpret all that information. This "more is better" approach is both distracting and inefficient.

Unfortunately, often times stress is the limiting factor to crewmembers successfully completing these critical and dangerous activities. These are, by definition, high-stress environments and the difficulty in absorbing more and more information is made worse by stress. The health of the crewmembers is also compromised by stress, and regrettably contributes to a majority of crewmember fatalities every year.

The exemplary embodiments provide a cognitive load reducing platform having edge enhancement that leverages the principles of neuroscience and the tools of computer vision to reduce the cognitive load of a user and elevate human performance in high stress environments. The principles of neuroscience are used to integrate sensor data into the natural senses in a manner that is optimized for the task at hand, e.g. search and rescue, and computer vision supplies the means in one embodiment. The cognitive load reducing platform significantly enhances the crewmembers' or user's ability to make well informed decisions rapidly when operating in complex environments where cognitive abilities decline. A premise of the cognitive load reducing platform is that if thinking and understanding are easier for crewmembers, then crewmember can achieve objectives more rapidly, spend less time in harsh conditions, and have potentially reduced stress levels because of the real-time assurance or reinforcement of a human sense, i.e., vision, hearing and or touch. Example users of the cognitive load reducing platform include, but are not limited to, firefighters, surgeons, soldiers, police officers, search and rescue and other types of first responders.

FIG. 1 is a diagram illustrating one embodiment of a cognitive load reducing platform according to one embodiment. In one embodiment, the cognitive load reducing platform is a wearable electronic system worn on the body of a user when the user is engaged in complex, high stress environments that reduce cognitive abilities.

The cognitive load reducing platform 10 comprises, one or more sensors 12a-12n (collectively sensors 12) that collect information about an environment as sensor data. The information collected about the environment refers primarily to sensor data that can be used for navigation and detecting hazards, but also to a user's health status. In one embodiment, the sensors are worn by the crewmembers. For example, multiple sensors may be incorporated into a sensor package that is worn by one or more crewmembers. In another embodiment, other sensors may be remote from the crewmembers, such as on a drone equipped with a camera, gas detector, and the like.

Example categories of sensors includes situational awareness sensors and biometric sensors for health status. The situational awareness sensors measure data about the user's external environment for hazard detection and navigation. Examples of situational awareness sensors for hazard detection may include, but are not limited to: cameras (e.g., a TIC, a radiometric thermal camera, a drone camera), a spectrometer, a photosensor, magnetometer, a seismometer, a gas detector, a chemical sensor, a radiological sensor, a voltage detector, a flow sensor, a scale, a thermometer, a pressure sensor, and an acoustic sensor (e.g., for selective active noise cancellation inside the mask to facilitate radio communication). Examples of situational awareness sensors used for user navigation may include, but are not limited to: an inertial measurement unit (IMU), a GPS sensor, a speedometer, a pedometer, an accelerometer, an altimeter, a barometer, attitude indicator, a depth gauge, a compass (e.g., a fluxgate compass), a gyroscope, and the like. Examples of biometric sensors that measure health conditions/status of the user may include, but are not limited to: a heart rate sensor, a blood pressure monitor, a glucose sensor, an electrocardiogram (EKG or ECG) sensor, an electroencephalogram (EEG) sensor, an electromyography (EMG) sensor, a respiration sensor, and a neurological sensor.

The platform also includes a high-speed processor complex 14 coupled to the sensors 12. The high-speed processor complex 14 includes a memory 16, a communication interface 19, and one or more processors 18, such as graphics processor units (GPUs). The processor/GPUs 18 execute one more software-based cognitive enhancement engines 20 to process the sensor data from the sensors 12 into enhanced characterization data that incorporate contextual and physiological visuals, auditory and/or haptic cues. The cognitive load reducing platform 200 is sensor agnostic and as any type of sensor can be added to the platform as long a corresponding cognitive enhancement engine 20 is provided to process and present that sensor data. The memory 16 may contain sensor data collected from the one or more sensors 12, and may store the cognitive enhancement engines 20 for implementing the processes described herein when executed by the one or more processors 18. Although the edge enhancement engines 20 are described as single modules, the functionality provided by the edge enhancement engines 20 may be performed by multiple modules.

The cognitive load reducing platform 10 further includes one or more output devices 22 coupled to the processor complex 14 to electronically communicate the enhanced characterization data to the wearer. In one embodiment, the output devices 22 may be implemented as a visual display, headphones/ear buds and/or a haptic device. The enhanced characterization data is thus integrated into natural senses of the wearer in a manner that is optimized for the performance of a specific task of the user—navigating in limited, to no, view environments.

Prior solutions increase the amount of information provided to the user's senses without specifically enhancing the brain's existing (and unmatched) cognitive ability to make sense of that information. The cognitive load reducing platform 10, in contrast, filters, summarizes, and focuses sensor data into the enhanced characterization data comprising contextual and physiological visuals, audio and/or haptic cues to create a new category called "Assisted Perception" that significantly reduces complexity and cognitive load (and accompanying stress)—and decreases Time-To-Clarity required to save lives. The cognitive load reducing platform 10 is designed to reduce risk, improve human safety, and save lives.

The cognitive load reducing platform supports the introduction of life-saving, Assisted Perception solutions to high-stress environments. One example use of this new category of Assisted Perception is as a firefighting vision system. In this embodiment, the cognitive load reducing platform is a real-time computer vision engine designed to aid first responders as they navigate smoke filled, hazardous environments with little or no visible light. In this embodiment, the cognitive load reducing platform increases the speed and safety of first responders in the field with a focus upon navigation and visual communication applications. The Assisted Perception of the cognitive load reducing platform dramatically enhances one's ability to make well informed decisions rapidly when operating in complex environments where cognitive abilities decline. The platform has shown performance improvements of 267% (e.g., reducing the time to complete mission critical search and rescue tasks from 4.5 mins to 1.7 mins).

Several emergency response systems are based on the use of a thermal camera and AR optics to provide a hands-free imaging system to the user. However, the cognitive load reducing platform provides a novel integrated design of these hardware and software elements into a system that efficiently integrates into natural human visual perception in a manner that decreases stress in the field. In the first responder embodiment, the platform combines a unique combination of enhanced thermal imaging, augmented reality (AR) or virtual reality (VR), and environment visualization and mapping capabilities.

Figure 2A:
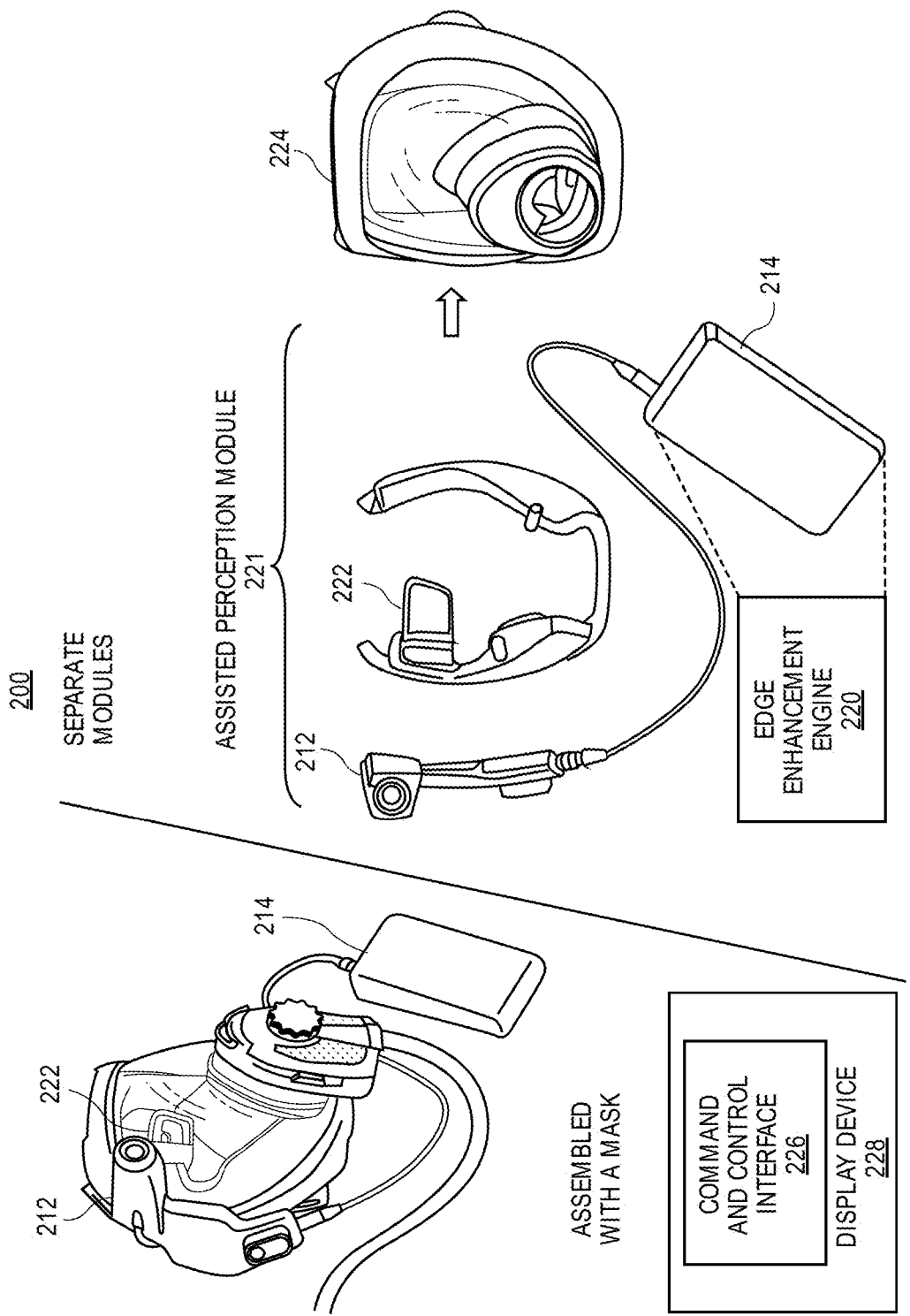
FIGS. 2A and 2B are diagrams illustrating components of the cognitive load reducing platform in a firefighting vision system embodiment.
Figure 2B:
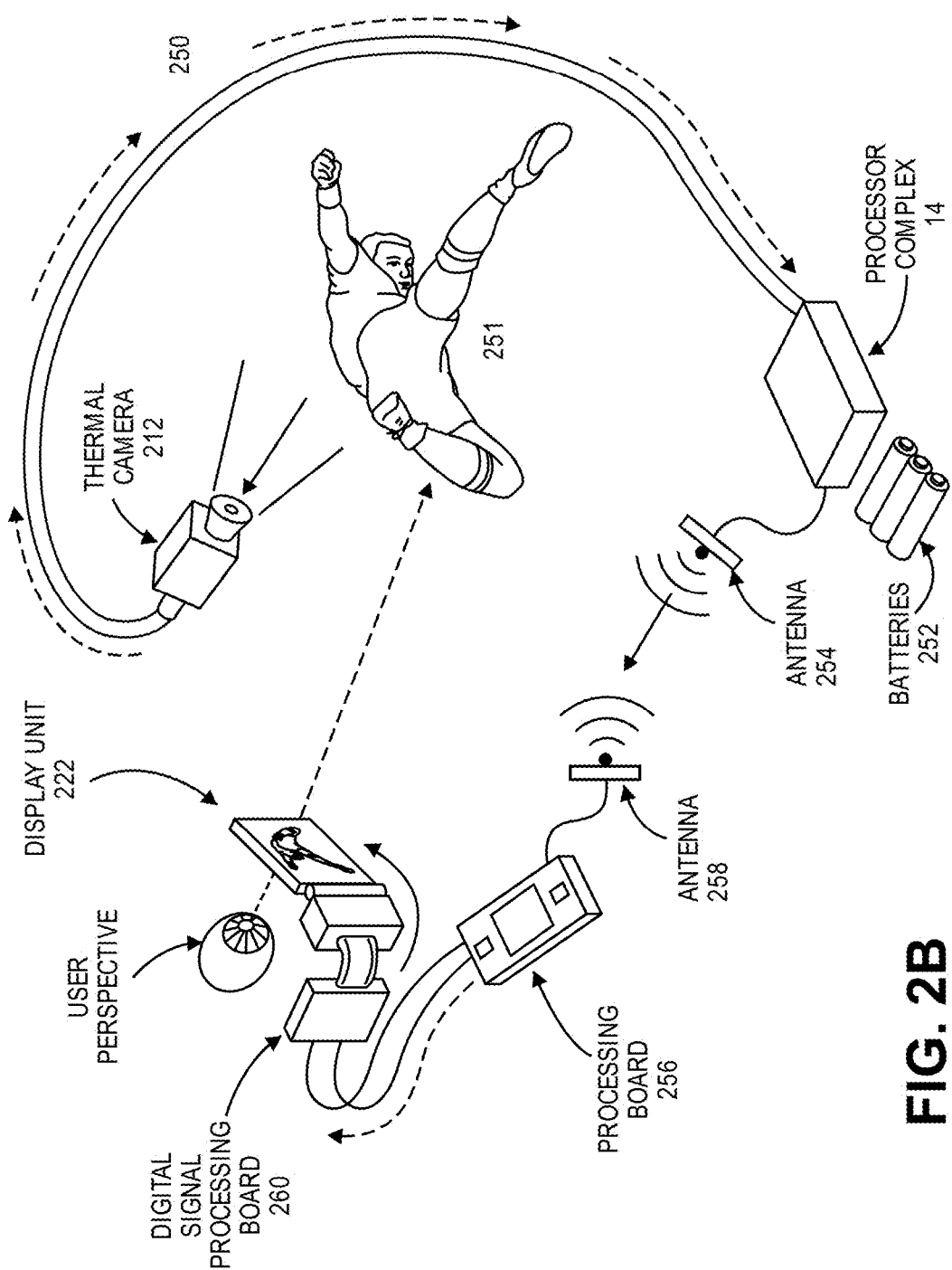

FIGS. 2A and 2B are diagrams illustrating components of the cognitive load reducing platform in the firefighting vision system embodiment. Referring to FIG. 2A, in one embodiment, the cognitive load reducing platform 200 comprises two components: i) an assisted perception module 221 integrated with a face mask 224 (or simply "mask") of the SCBA worn by each user/crewmember; and ii) a command and control interface 226 displayed on a display device 228 to a person of authority, such as an incident commander. The command and control interface 226 enables the person of authority to manage the incident and the crewmembers wearing respective assisted perception modules 221 by displaying the enhanced characterization data from each of the respective assisted perception modules.

Each of the assisted perception modules 221 comprises a modular set of components including a TIC 212, a processor complex 214 in communication with the TIC 212 for executing an edge enhancement engine 220, and a display unit 222, which is removably attached to the mask 224. In relation to FIG. 1, the TIC 212 in FIG. 2A comprises one of the sensors 12 of the platform 200, the display unit 222 comprises the output device 22, and the edge enhancement engine 220 comprises the cognitive enhancement engine 20 executed on the processor complex 214.

In the embodiment shown, the display unit 222 may comprise an augmented reality (AR) display unit, a virtual reality (VR) display unit, or a head-mounted projection display unit. In the AR embodiment, the AR display unit may comprise optical see through glasses that can be either binocular or monocular. FIG. 2A shows an embodiment where the display unit 222 comprises an AR monocular display.

FIG. 2B is a diagram showing an exploded view of the assisted perception module 221 showing additional components in a wireless embodiment. The TIC 212 captures thermal image data of obstacles and objects 251 and sends the thermal image data via a cable 250 to the processor complex 14. The exploded view of the processor complex 14 shows that the processor complex 14 is powered by batteries 252 and the communication interface 19 of FIG. 1 is coupled to an antenna 254 to wirelessly transmit enhanced image data to the display unit 222. The display unit 222 further includes a processing board 256 with an antenna 258 to receive the enhanced image data wirelessly transmitted from the processor complex 14. The processing board 256 relays the enhanced image data to a digital signal processing board 260, which processes the enhanced image data for display on the display unit 222 directly in front of the user's eye.

As stated above, in one embodiment, the cognitive load reducing platform is a wearable electronic system. As such, there are many placement embodiments for the components of the cognitive load reducing platform. In most embodiments, all components are located on, or otherwise carried by, a user. For example, FIGS. 2A and 2B illustrate an embodiment where the TIC 212 (sensors 12) and the display unit 222 (output device 22) are carried by the user by virtue of being integrated with mask 224. The processor complex 214 is also worn by the user, such as being clipped to a belt or clothing, stowed in a pouch or a pocket, or attached to a back frame of the SCBA.

In some embodiments, however, the sensors 12 and/or the processor complex 14 may be located remote from the user. As an example, consider the use case where a remote gas sensor controlled by a third party sends gas data over a network (e.g., Internet) to the cognitive load reducing platform 10. In this embodiment, the cognitive load reducing platform 10 may be implemented at least in part as a website where the processor complex 14 is implemented as one or more servers that wirelessly receives sensor data of various types. In this embodiment, the gas sensor data from the remote gas sensor is pushed to the processor complex 14 where the sensor data is processed locally by a corresponding cognitive enhancement engine 20, which converts and outputs a brain optimized visual format for display to the user on the display unit 22. In one embodiment, a third party could collect and push the gas sensor data into the cognitive load reducing platform in the cloud.

There are also many communication embodiments for the components of the cognitive load reducing platform. For example, in the embodiment shown in FIGS. 2A and 2B, the TIC 212 communicates with the processor complex 214 over a wired connection via cable 250. However, in an alternative embodiment, the TIC 212 wirelessly communicates with the processor complex 14. In the embodiment shown in FIGS. 2A and 2B, the processor complex 214 communicates with the AR display unit over a wireless connection. However, in an alternative embodiment, the processor complex 214 communicates with the AR display unit over a wired connection. In yet a further embodiment, the TIC 212 and the processor complex 214 may be integrated together within a common housing, in which case the TIC 212 is in direct communication with the processor complex 214, and the communication between the processor complex 214 and the display unit 222 could be over a wired or wireless connection. In either embodiment, the display unit 222 would still communicate wirelessly with the central command display device 228.

In one embodiment, the display unit 222 (including digital signal processing board 260, processing board 256, and antenna 258) is mounted inside the mask 224. However, in an alternative embodiment, the display unit 222 is mounted outside the mask 224. For example, the display itself may be positioned outside the mask 224, while the digital signal processing board 260, processing board 256 and antenna 258, may be worn by the user, such as being clipped to a belt or clothing, stowed in a pouch or a pocket, or attached to a back frame of the SCBA.

According to one aspect of the disclosed embodiments, the edge enhancement engine 220 executed by the processor complex 214 in the firefighting embodiment performs high speed processing on the thermal images from the TIC 212 in real time into enhanced characterization data comprising a stream of wireframe images where edges of objects appearing in the thermal images have increased luminosity and contrast in relation to the thermal images. The display unit is worn in a line of sight of the user and electronically displays the enhanced characterization data, where the stream of the wireframe images appear as decluttered, enhanced line drawings to enable the user to see and navigate in obscure conditions, while reducing the cognitive load of the user. In one embodiment, the enhanced characterization data comprises a stream of AR/VR or wireframe images having enhanced the edges or outlines of objects that are projected on the display device in the user's field of view, so the user can see and effectively navigate in dark or smoke-filled environments without overwhelming the user's ability to process the displayed information. In this embodiment, the enhanced line drawing images produced by the platform dramatically enhance the user's ability to make well-informed decisions rapidly when operating in complex environments where cognitive abilities decline, such as a first responder (e.g., a fire fighter or search and rescue personnel).

FIGS. 3A and 3B are diagram illustrating example enhanced wireframe images displayed on the display unit 222. The enhanced wireframe images are shown on a transparent AR or head mounted projection display placed directly within the user's line of sight to provide real time navigation. The enhanced wireframe images of the disclosed embodiments have enhanced edges and a decluttered appearance after processing of thermal images/video by the cognitive load reducing platform. In other words, the enhanced images clarify the TIC video by highlighting key details with bright edges and minimizing the rest. Notice that the edge enhancement engine 220 is not optimized to recognize objects in the thermal images nor to create continuous lines outlining the objects, but is rather optimized to reduce visual complexity by filtering out faint elements and boosting contrast throughout the image. A close review of the enhanced wireframe images in FIGS. 3A and 3B reveals some or all the edges outlining objects may have small breaks and thus may not meet the mathematical definition of a continuous line, but when viewed by a human, the brain easily completes the scene and can recognize simple objects sufficiently enough to navigate. In an alternative embodiment, the edge enhancement engine 220 may create wireframe images having continuous lines outlining the objects.

The enhanced wireframe images overlayed in front of a user's eye in real time are designed to save lives by providing the user (e.g., a firefighter) with just the information the user needs, instead of overloaded the user as can be easily done in stressful situations. As shown, the assisted perception module 221 enables the user to see in dark, smoke-filled environments. However, seeing through smoke is a side benefit to the value of the cognitive load reducing platform, which is to reduce the visual complexity of hazardous environments, while allowing individuals to more easily make sense of their surroundings.

The Assisted Perception provided by the cognitive load reduction platform leverages the principles of neuroscience to enhance aggregated sensor data in real-time to allow first responders to do their jobs significantly faster and more safely. The closest competitor to an infrared sensor-based, extreme environment tool would be the handheld or helmet mounted infrared camera and display systems. However, none of these systems offer any context-specific interpretive processing of the output, nor are they designed as true augmented reality interfaces that reduce the cognitive load of the user.

Referring again to FIG. 2A, the wireless capabilities of the processor complex 14 is also used create a shared experience between the crewmembers and the incident commander (IC) via the command and control interface 226. According to the present embodiment, the command and control interface 226 runs on the display device 228 to the incident commander and is associated or paired to a group of the AR modules 221 worn by crewmembers. Through its wireless capabilities, each assisted perception module 221 streams its enhanced image to the command and control interface 226 on the display device 228 so that the incident commander can see in real time what the crewmembers see. Thus, the platform improves situational awareness on the front lines as well as to create a shared operating picture with the commander on the backend through a cognitive load reducing command and control interface 226 that aggregates information and presents insights to the commander via a simplified GUI based on similar principals of neuroscience.

FIG. 4 is a diagram illustrating an example command and control interface of the cognitive load reducing platform. In one embodiment, the display device 228 comprises a tablet computer or large mobile phone, and the command and control interface 226 comprises multiple sub-panels or frames for displaying the streams from each of the AR modules 221 of the crewmembers (e.g., up to 8). There are two communication modes. In the first communication mode, the incident commander can select any sub-panel to engage in audio or visual icon based communication. In the second communication mode, the incident commander can broadcast to all of the AR modules 221 equipped crewmembers in the field.

Traditional emergency response tools to aid the incident commander focus upon the incident commander's ability to integrate information unavailable to the crewmembers, and to then communicate these insights via radio channels. In contrast, the cognitive load reducing platform allows the incident commander to see the moment to moment visual experience of their crewmembers and to communicate back to them using visual cues displayed to crewmembers equipped with AR modules 221. Consequently, the connected nature of the platform (streaming visual data between AR modules 221 to the central command display device 228) elevates the safety of the entire workspace by providing a shared operating picture between individuals in the field and leaders monitoring workers from the periphery.

Edge Enhancement

Referring again to FIGS. 2A and 2B, in the firefighting embodiment, the edge enhancement engine 220 performs high speed processing on the thermal images from the TIC 212 to enhance the edges or outlines of objects therein. In one embodiment, the edge enhancement engine 220 utilizes histogram equalization algorithms designed to facilitate the human brain's ability to make rapid and accurate inferences related to navigation. The histogram equalization algorithms reduce and declutter thermal image data to a simple "line drawing" or "cartoon image" that leverages the underlying neuro-structure of vision to aid in navigation.

Figure 5:
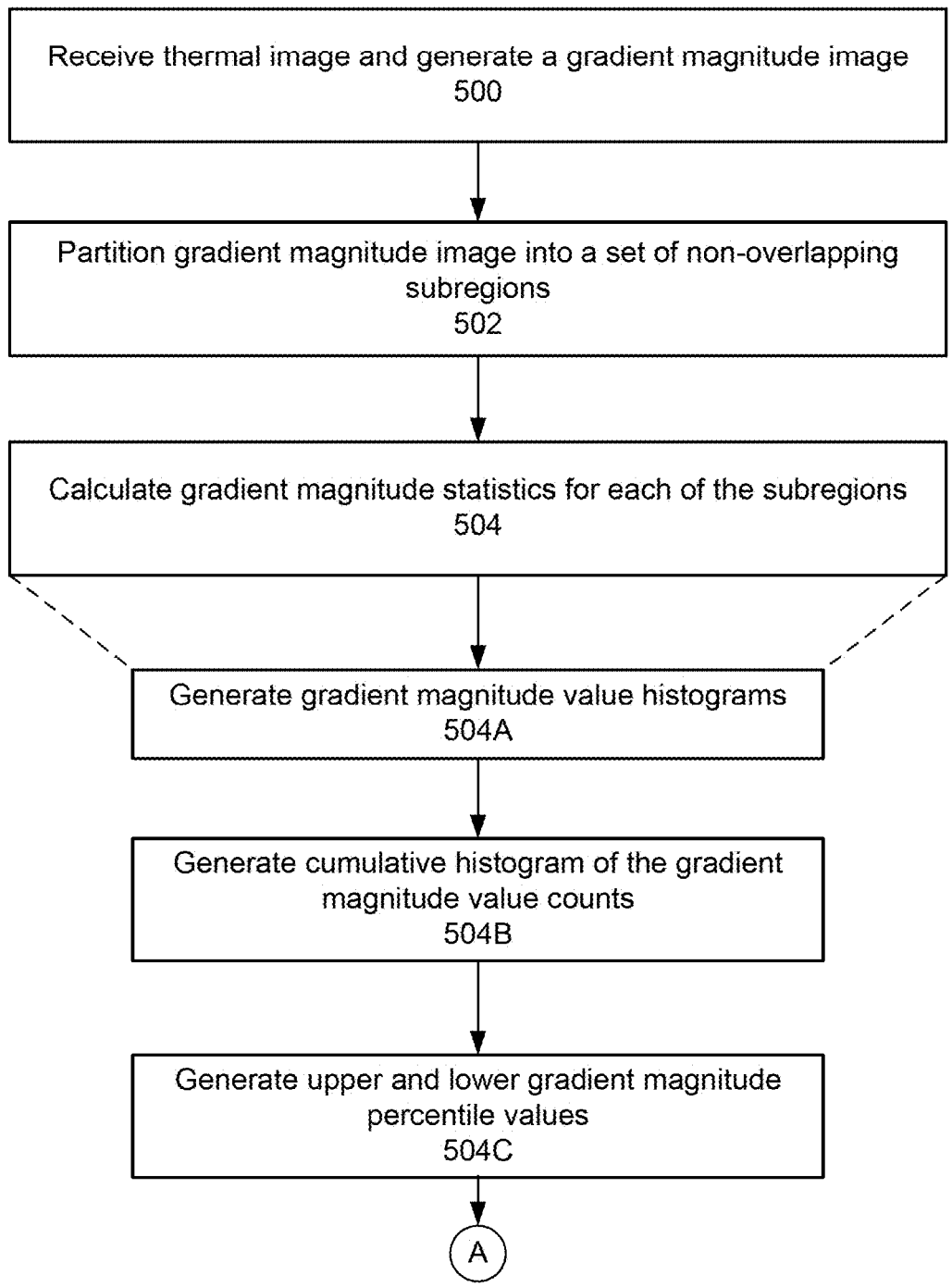
FIG. 5 is a flow diagram illustrating the process performed by the edge enhancement engine on the thermal images to enhance the edges of objects therein to improve user vision and navigation a user in obscure environments, while reducing cognitive load of the user.
Figure 5:
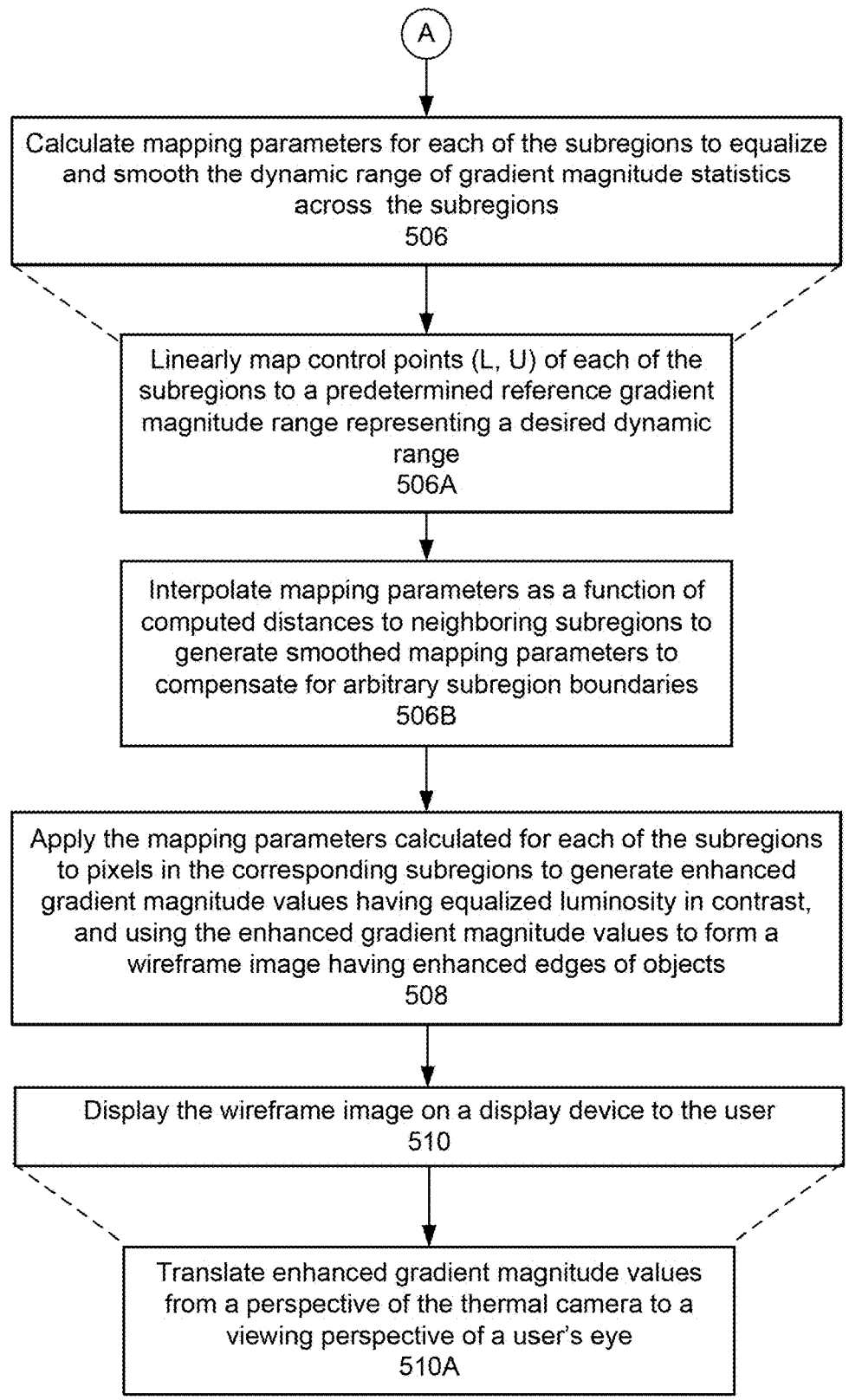

FIG. 5 is a flow diagram illustrating the process performed by the edge enhancement engine 220 on the thermal images to enhance the edges of objects therein to improve user vision and navigation a user in obscure environments, while reducing cognitive load of the user.

The process may begin by receiving a series of one or more thermal images and generating a gradient magnitude image from the thermal images, the gradient magnitude image comprising a plurality of pixels having associated gradient magnitude values (block 500). A series of the thermal images form a video that is streamed out of TIC 212 and into the processor complex 214 in real-time. In one embodiment, each pixel in thermal image may be 8-bits in length and have 256 possible intensities.

Figure 6:
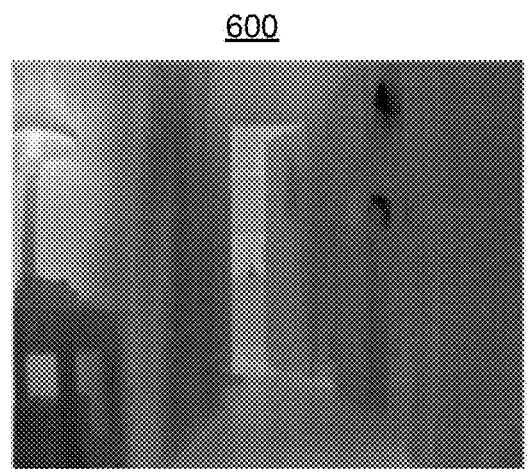
FIG. 6 is an illustration an example thermal image received from the TIC.

FIG. 6 is an illustration an example thermal image received from the TIC. Thermal images are normally grayscale where black objects represent cold temperatures, white objects represent hot temperatures, and the depth of gray indicates variations between the two. Some thermal cameras, such as radiometric thermal cameras that measure surface temperatures, add color to the images to aid users in identifying objects at different temperatures. In the example shown, the thermal image 600 is an 8-bit grayscale image having grayed edges and faint contours.

The brightness or luminosity of object edges in the thermal image 600 are not uniform, ranging from very bright to very faint. When displayed to a user in this form, the thermal image 600 makes it difficult for first responders to quickly determine what they are seeing, and then determine a course of action, such as determining how to quickly and safely navigate the environment. One goal of the disclosed embodiments is to generate wireframe images were object edges throughout the image have uniform brightness. In one embodiment, the object edges may have uniform thickness as well. In a further embodiment, however, the object edges may have varying thickness related to a perceived distance of the object that from the TIC/user. For example, object edges closer to the user may be displayed with increased thickness compared with object edges farther from the user.

In one embodiment, the gradient magnitude of each pixel in the thermal image may be extracted using a 2D Gaussian filter to create a smoothed image. Next, x- and y-axis gradients ($g_x$ and $g_y$) may be approximated by convolving the smoothed image with orthogonal (e.g., vertical and horizontal) Sobel filters to determine how much gray levels in the thermal image change in vertical and horizontal directions, respectively. The output of the Sobel filters may be combined pixel-wise through a l2-norm filter to produce the gradient magnitude image.

Figure 7:
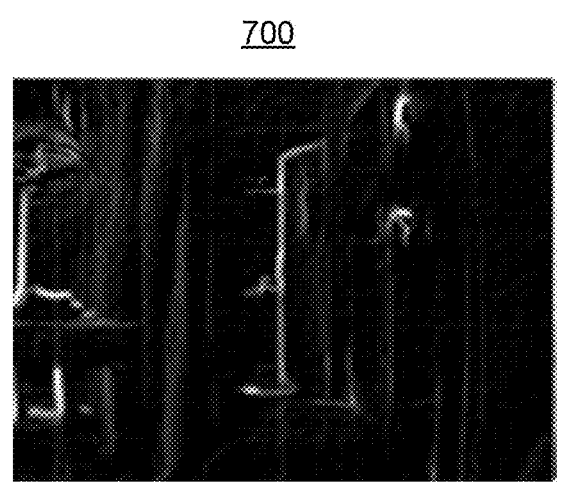
FIG. 7 is an illustration of an example gradient magnitude image generated from the thermal image of FIG. 6.

FIG. 7 is an illustration of an example gradient magnitude image generated from the thermal image of FIG. 6. The gradient magnitude image 700 is a local estimate of contrast per pixel. Brighter pixel levels in the gradient magnitude image 700 indicate a change from a dark value to a bright value in the thermal image, and darker pixel levels in the gradient magnitude image 700 indicate a change from a bright value to a dark value in the thermal image. More specifically, white pixels indicate a high change in luminosity in the initial thermal image, while black pixels indicate no change at all. The gradient magnitude image 700 has a significant amount of pixel noise from the TIC and discontinuities due to the 8-bit space.

Referring again to FIG. 5, the gradient magnitude image 700 is an estimate of contrast per pixel location, but an edge or line of an object in the image is not defined by a single pixel, but rather a region of space. Therefore, referring again to FIG. 5, the edge enhancement engine 220 continues by partitioning the gradient magnitude image 700 into a set of subregions to analyze luminosity and contrast in regions of space in the gradient magnitude image 700 (block 502). In one embodiment, the gradient magnitude image is partitioned into a set of non-overlapping subregions.

Figure 8:
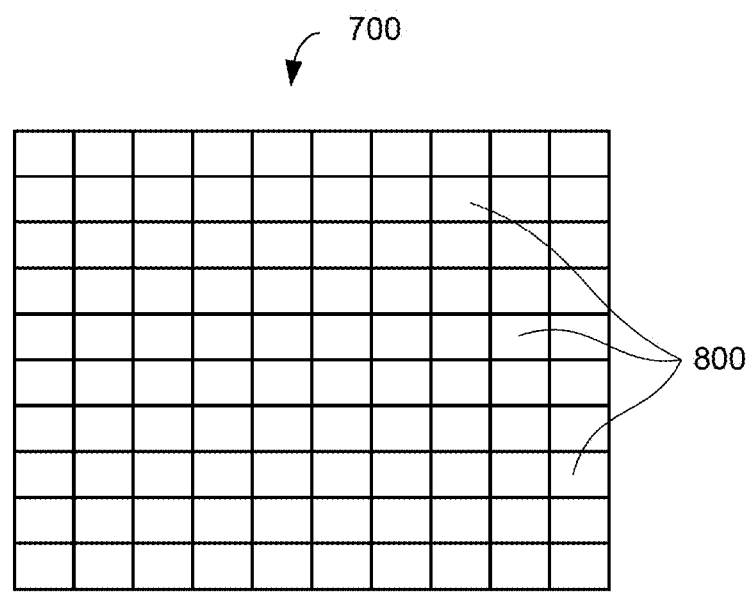
FIG. 8 is a diagram graphically illustrating the gradient magnitude image partitioned into a set of non-overlapping subregions.

FIG. 8 is a diagram graphically illustrating the gradient magnitude image 700 partitioned into a set of non-overlapping subregions 800. In an example embodiment where the thermal image comprises 640×480 pixels or 307,200 total pixels, the gradient magnitude image 700 may be partitioned into 300 subregions 800, each 32×32 pixels is size for a total of 1024 pixels.

Referring again to FIG. 5, the edge enhancement engine 220 calculates gradient magnitude value statistics for each of the subregions (block 504). In one embodiment, calculating the gradient magnitude statistics comprises for each of the subregions, generating a subregion histogram of gradient magnitude values that counts the number of pixels having each gradient magnitude value (block 504A); generating cumulative gradient magnitude value counts (block 504B); and generating upper and lower gradient magnitude percentile values (block 504C). In some embodiments, the gradient magnitude value statistics for the subregions may be computed in parallel.

Figure 9:
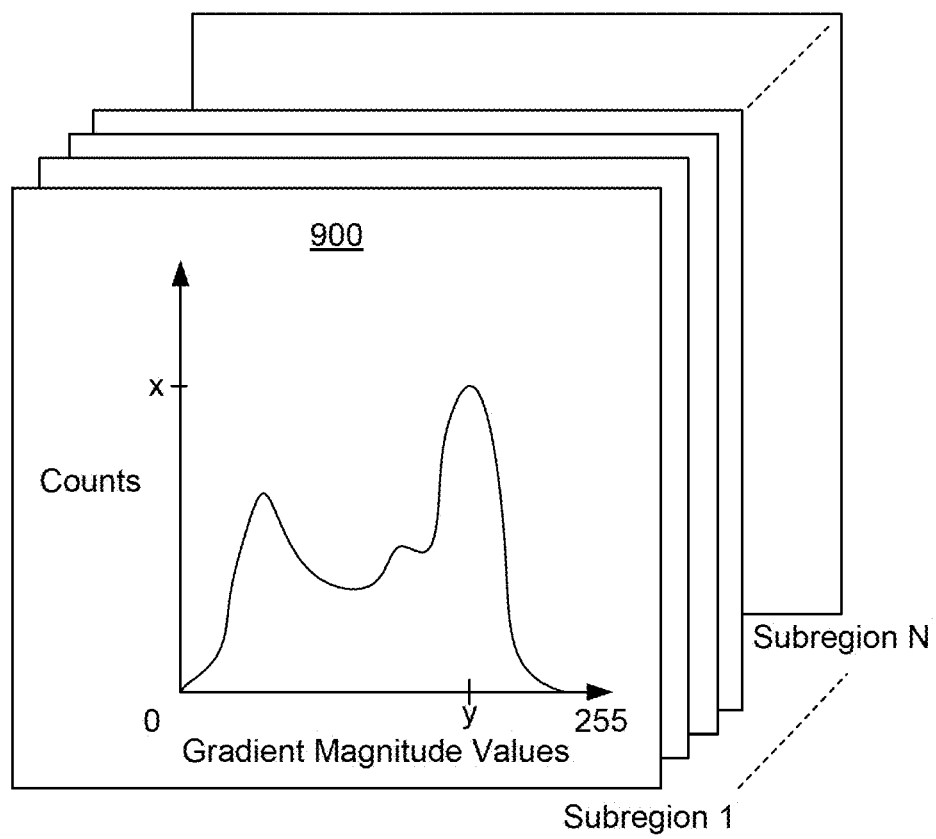
FIG. 9 is a diagram illustrating an example subregion histogram.

FIG. 9 is a diagram illustrating an example subregion histogram 900. One subregion histogram 900 is generated for each of the subregions 800. The x-axis of the subregion histogram 900 represents possible gradient magnitude values, and the y-axis is the number of pixels at each different gradient magnitude value found in the subregion. In FIG. 9, the peak in the graph in the subregion histogram 900 may indicate, for example, that a number "x" of pixels in the subregion have a gradient magnitude value of "y". For an 8-bit image, each pixel has a gradient magnitude value ranging from 0 to 255, which is reflected on the x-axis. As another example, in a 16-bit image, each pixel has a gradient magnitude value ranging between 0 and 65,535.

Referring again to FIG. 5, generating the cumulative histogram of the gradient magnitude value counts for each of the subregions (block 504B) may comprise performing a cumulative sum operation on each subregion gradient magnitude value histogram that returns a cumulative sum of the gradient magnitude value histogram of each subregion. The cumulative sum operation is a sequence of partial sums of a given sequence. For example, the cumulative sums of the sequence {a, b, c . . . }, are a, a+b, a+b+c, . . . .

Figure 10:
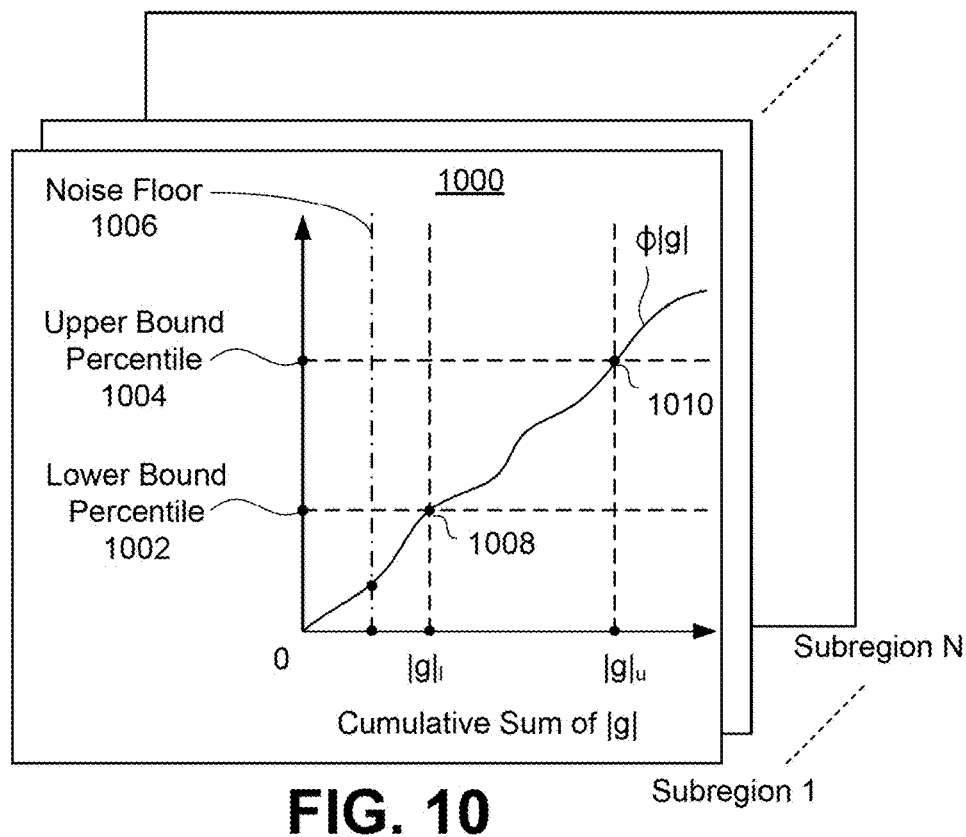
FIG. 10 is a diagram illustrating an example cumulative histogram generated from the gradient magnitude value histogram of one particular subregion.

FIG. 10 is a diagram illustrating an example cumulative histogram generated from the gradient magnitude value histogram of one particular subregion. In one embodiment, the cumulative histogram 1000 of the gradient magnitude value histogram is represented as ϕ|g|. The x-axis represents the cumulative sums of the gradient magnitude value counts, which range between 0 and the number of pixels within the subregion. The y-axis shows the proportion of counts less than or equal to "x".

According to one aspect of the disclosed embodiments, generating upper and lower gradient magnitude percentile values (FIG. 5, block 504C) may comprise applying a predetermined lower bound percentage 1002 and upper bound percentage 1004 to the cumulative histogram ϕ|g| for each of the subregions. The goal is to determine the gradient magnitude value at the lower bound percentage 1002 and upper bound percentage 1004, which are parameters that remain the same across all the subregions, and therefore are referred to as invariants. In one embodiment, the lower bound percentile 1002 is set between a $5^{th}$ percentile and a $20^{th}$ percentile, or a $10^{th}$ percentile in a particular embodiment. In one embodiment, the upper bound percentile 1004 is set between an $80^{th}$ percentile and a $95^{th}$ percentile, or a $90^{th}$ percentile in a particular embodiment.

In a further embodiment, to compensate for background noise from the TIC, an absolute minimum percentile 1006 may be placed upon the gradient magnitude values to censor noise. Basically, while the edge enhancement engine 220 analyzes how statistics for the gradient magnitude values in the different subregions differ, the absolute minimum percentile 1006 is used to minimize the effect of uniform noise in the scene. The predetermined upper and lower bound gradient percentiles 1002 and 1004 and the absolute minimum percentile 1006 are applied to the gradient magnitude values across all the subregions.

The gradient magnitude value at a point 1008 where the cumulative histogram crosses the lower bound percentile 1002 and a point 1010 where the cumulative histogram crosses the upper bound percentile 1004 may then be extracted to determine the gradient magnitude value at the $10^{th}$ percentile and the $90^{th}$ percentile. In one embodiment, "L" is set equal to the gradient magnitude value 1008 at the lower bound percentile 1002 (also represented as IV, and "U" is set equal to the gradient magnitude value 1010 at the upper bound percentile 1004 (also represented as $|g|_u$). The output of this process are gradient magnitude value control points (L, M) for each of the subregions 800.

Referring again to FIG. 5, according to the disclosed embodiments, the edge enhancement engine 220 calculates mapping parameters for each of the subregions to equalize and smooth the dynamic range of the corresponding gradient magnitude statistics across the subregions (block 506). By equalizing and smoothing the dynamic range of the great magnitude statistics across the subregions, minimum and maximum gradient magnitude values in each subregion are made substantially similar or uniform. As used herein the gradient magnitude values reflect luminosity and contrast.

In one embodiment, the process of calculating the mapping parameters may comprise determining mapping parameters necessary to linearly map the control points (L, U) of each subregion 800 to a predetermined reference gradient magnitude representing a desired dynamic range (block 506A). Using this process, a spatially non-local description of contrast within each subregion is equalized in that region to match the desired dynamic range across all the subregions.

Figure 11:
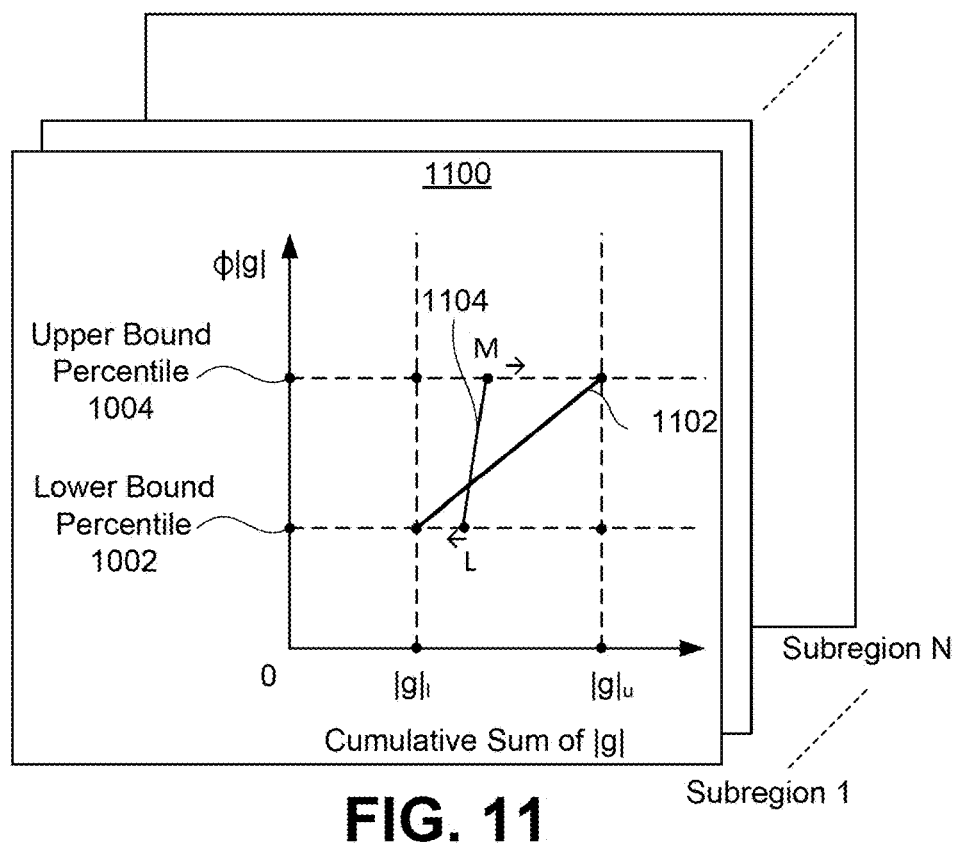
FIG. 11 is a diagram graphically illustrating an example of linear mapping 1100 of subregion gradient magnitude values represented by line formed between control points (L, U) to predetermined reference gradient magnitude values.

FIG. 11 is a diagram graphically illustrating an example of linear mapping 1100 of subregion gradient magnitude values represented by line 1104 formed between control points (L, U) to predetermined reference gradient magnitude values represented by 1102. As in FIG. 10, the x-axis represent the cumulative histogram of the gradient magnitude values, which range between 0 and 255 for the 8-bit pixels. The y-axis shows percentiles of gradient magnitude values, including the invariant predetermined lower bound percentile 1002 and the upper bound percentile 1004. The reference gradient magnitude 1104, the lower bound percentile 1002 and the upper bound percentile 1004 remain the same across all subregions 800.

The reference gradient magnitude is represented as diagonal line 1102 formed with positive slope between the intersection of the lower bound percentile 1002 (10th percentile) and gradient magnitude value $|g|_l$, and the intersection of the upper bound percentile 1004 ($90^{th}$ percentile) and gradient magnitude value $|g|_u$.

A subregion gradient magnitude is represented as a line 1104 formed between control points (L, M) of the current subregion. The subregion gradient magnitude line 1104 shows that the subregion is in an area of the gradient magnitude image that is dim and has low contrast (shown by the steep slope). The linear mapping process 1100 finds mapping parameters that moves the upper value control point M of the subregion gradient magnitude line 1104 to the right to align with the intersection of the upper bound percentile 1004 and $|g|_u$ of the gradient magnitude line 1102; and moves the lower value control point L to the left toward the intersection of lower bound percentile 1002 and $|g|_l$ of the gradient magnitude line 1102. The mapping parameters will now match the subregion gradient magnitude with the reference gradient magnitude to provide improved luminosity and contrast.

In one embodiment, the linear mapping process is performed by determining an intercept and slope of the reference gradient magnitude line 1102 and using the intercept and slope to create linear mapping parameters to apply to each pixel in the subregion. In one embodiment, the linear mapping parameters are calculated as:

$$x'=f(\alpha,\beta,x); \text{ and } f(\alpha,\beta,x)=\beta x+\alpha,$$

where x=a current pixel gradient magnitude value, α=intercept, and β=slope. The result of this linear mapping is the equalized pixel value x'.

Referring again to FIG. 5, the linear mapping parameters (intercept α and slope β) to be applied to each pixel of the subregion are interpolated as a function of each pixel's computed distance to neighboring subregions to generate smoothed mapping parameters to compensate for arbitrary subregion boundaries (block 506B). In one embodiment, a 2D nearest neighbor interpolation scheme may be used. In another embodiment, a convolution process using a sliding window may be performed, but with the penalty of computational cost. In one embodiment, the computation of the distances between pixels in a subregion to neighboring subregions may be performed prior to generating the mapping parameters.

In one embodiment, the 2D nearest neighbor interpolation uses a weight function when performing the mapping parameter interpolation to give gradient magnitude values from closest subregions more "weight" or influence on the gradient magnitude values of pixels in the current subregion over other subregions.

Figure 12:
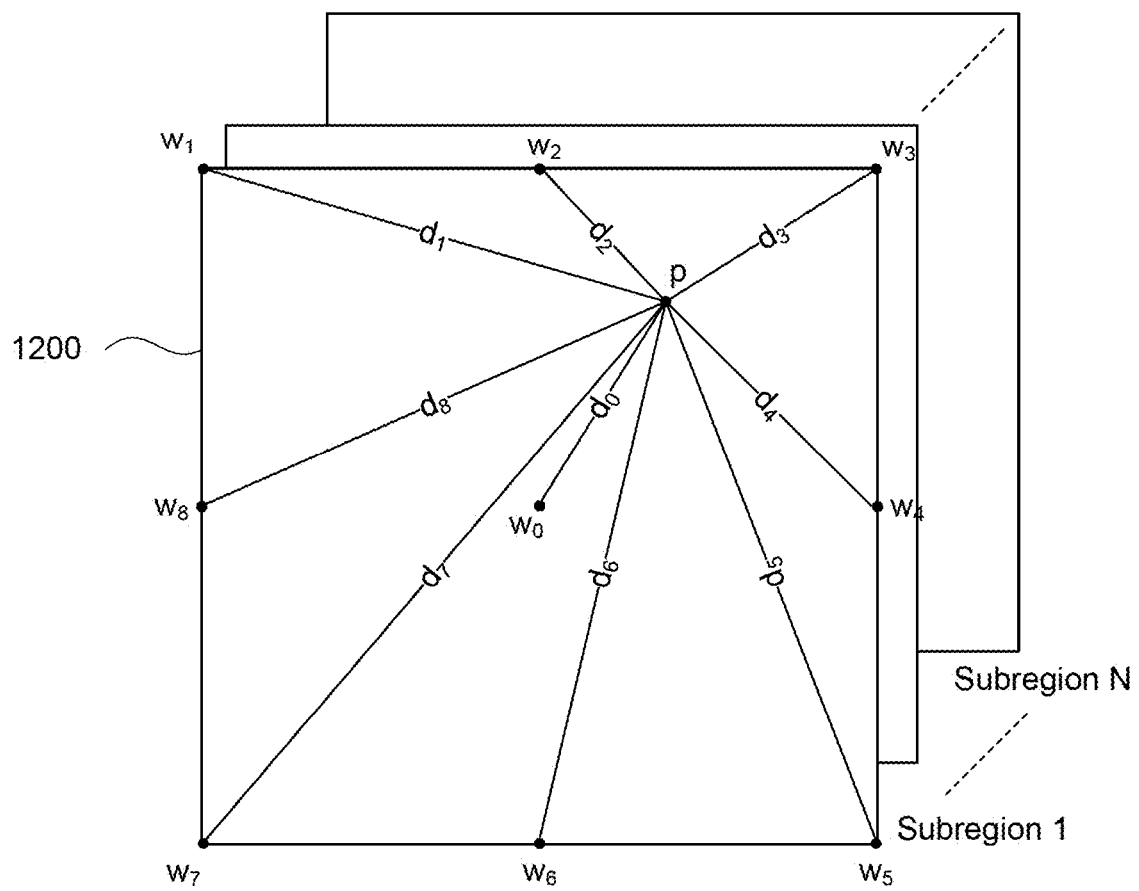
FIG. 12 is a diagram graphically illustrating an example of one embodiment of the weight function used to interpolate the subregion mapping parameters before applying the mapping parameters to pixels (p) in a current subregion.

FIG. 12 is a diagram graphically illustrating an example of one embodiment of the weight function used to interpolate the subregion mapping parameters before applying the mapping parameters to pixels (p) in a current subregion 1200. First, a set of anchor points ($w_i$) are defined that are to be applied to all of the subregions. In one embodiment, a set of i=9 anchor points ($w_0$-$w_8$) are defined, which are located at a center, four corners, and the four midpoints of each side of the subregion 1200. Next, for each pixel (p) in each respective subregion, weights are calculated for each anchor point by calculating the distance ($d_0$-$d_8$) between the current pixel and each of the anchor points representing neighboring subregions. In one embodiment, the weights are inversely proportional to the calculated distances.

Finally, the smoothed mapping parameters (intercept α and slope β) are calculated for each pixel (p) in the respective subregion as a weighted sum of α and β for the anchor points $w_i$:

$$\alpha_p = E_{i=0}^{8} f(wi) * \alpha_i \text{ and } \beta_p = E_{i=0}^{8} f(wi) * \beta_i.$$

Referring again to FIG. 5, the edge enhancement engine 220 applies the mapping parameters calculated for each of the subregions to pixels in the corresponding subregions to generate enhanced gradient magnitude values having equalized luminosity in contrast, and using the enhanced gradient magnitude values to form a wireframe image having enhanced edges of objects (block 508). In one embodiment, the smoothed mapping parameters generated for each pixel (p) are applied to the respective pixels in the gradient magnitude image to create the wireframe image (See examples shown in FIGS. 3A and 3B).

The wireframe image is then displayed on a display device to the user, wherein the wireframe image appears as a decluttered line drawing where the enhanced edges have equalized luminosity and contrast compared to the thermal image to reduce the cognitive load of the user (block 510). Preferably, the wireframe image is displayed as a video stream in real time on the display device, such as display unit 222, and in a line of sight of the user's eye.

In one embodiment, displaying the wireframe image on a display device, further comprises first translating the enhanced gradient magnitude values from a perspective of the TIC that captured the thermal image to a viewing perspective of an eye of the user (block 510A). In one embodiment, a transformation operator may perform an affine transformation that is user configurable through a set of controls (e.g., a keyboard). The affine transformation (T) may be implemented as follows:

$$x' = T_t(x); \quad T_t(x) = T_{t-1}(x) + \delta_t(x),$$

where x=a current pixel enhanced gradient magnitude value, and $T_t$ is the current transformation, which is incrementally adjusted from $T_{t-1}(x)$ by $\delta_t(x)$ until appropriate for the user. $T_t(x)$ is initialized to identity. The transformed gradient magnitude values may then be displayed as the wireframe image.

A method and system for a cognitive load reducing platform having image edge enhancement has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for enhancing edges of objects in a thermal image, the method comprising:
    receiving, by a processor, the thermal image from a thermal camera and generating, by the processor, a gradient magnitude image comprising a plurality of pixels having associated gradient magnitude values, wherein the processor and thermal camera are worn by a user, the processor executing a software engine to process thermal images into wireframe images in real time, the software engine operational for;
    partitioning the gradient magnitude image into subregions;
    calculating gradient magnitude statistics for each of the subregions;
    calculating mapping parameters for each of the subregions to equalize and smooth a dynamic range of the corresponding gradient magnitude statistics across the subregions, and interpolating the mapping parameters as a function of computed distances to neighboring subregions to generate smoothed mapping parameters to compensate for arbitrary subregion boundaries, wherein interpolating the mapping parameters comprises:
        defining a set of anchor points (wi) to be applied to all of the subregions;
        for each pixel (p) in a respective subregion, calculating weights for each anchor point by calculating the distance between a current pixel and each of the anchor points; and
        calculating the smoothed mapping parameters α=intercept and β=slope for each pixel (p) in the respective subregion as a weighted sum of α and β for the anchor points wi:

$$\alpha_p = \Sigma_{i=0}^{8} f(wi) * \alpha_i \text{ and } \beta_p = \Sigma_{i=0}^{8} f(wi) * \beta_i;$$

applying the mapping parameters calculated for each of the subregions to pixels in the corresponding subregions to generate enhanced gradient magnitude values having equalized luminosity and contrast, and using the enhanced gradient magnitude values to form a wireframe image having enhanced edges of objects; and
    displaying the wireframe image on a display device to the user, wherein the wireframe image appears as a decluttered line drawing where the enhanced edges have increased luminosity and contrast compared to the thermal image to reduce the cognitive load of the user.

2. The method of claim 1, wherein calculating gradient magnitude statistics further comprises: generating for each of the subregions a histogram of gradient magnitude values and cumulative gradient magnitude counts, and upper and lower gradient magnitude percentile values.

3. The method of claim 1, wherein calculating the mapping parameters, further comprises: determining the mapping parameters necessary to linearly map gradient magnitude value control points of each subregion to a predetermined reference gradient magnitude representing a desired dynamic range.

4. The method of claim 3, wherein calculating the mapping parameters, further comprises: determining an intercept and slope of the reference gradient magnitude and using the intercept and the slope to create the mapping parameters to apply to each pixel in the subregion.

5. The method of claim 4, wherein calculating the mapping parameters, further comprises: calculating the mapping parameters as:

$$x' = f(\alpha, \beta, x); \text{ and } f(\alpha, \beta, x) = \beta x + \alpha,$$

where x=a current pixel gradient magnitude value, α=intercept, and β=slope, and x'=equalized pixel value.

6. The method of claim 1, wherein displaying the wireframe image on the display device further comprises: translating the enhanced gradient magnitude values from a perspective of a thermal camera that captures the thermal image to a viewing perspective of an eye of the user.

7. A system, comprising:
a memory containing a thermal image from a thermal camera;
a processor coupled to the memory, wherein the thermal camera and the processor are worn by a user; and
a software component executed by the processor that is configured to perform:
receiving a thermal image and generating a gradient magnitude image comprising a plurality of pixels having associated gradient magnitude values;
partitioning the gradient magnitude image into subregions;
calculating gradient magnitude statistics for each of the subregions;
calculating mapping parameters for each of the subregions to equalize and smooth a dynamic range of the corresponding gradient magnitude statistics across the subregions, and interpolating the mapping parameters as a function of computed distances to neighboring subregions to generate smoothed mapping parameters to compensate for arbitrary subregion boundaries, wherein interpolating the mapping parameters comprises:
defining a set of anchor points (wi) to be applied to all of the subregions;
for each pixel (p) in a respective subregion, calculating weights for each anchor point by calculating the distance between a current pixel and each of the anchor points; and
calculating the smoothed mapping parameters $\alpha$=intercept and $\beta$=slope for each pixel (p) in the respective subregion as a weighted sum of for the anchor points wi:

$$\alpha_p = \Sigma_{i=0}^{8} f(wi) * \alpha_i \text{ and } \beta_p = \Sigma_{i=0}^{8} f(wi) * \beta_i;$$

applying the mapping parameters calculated for each of the subregions to pixels in the corresponding subregions to generate enhanced gradient magnitude values having equalized luminosity and contrast, and using the enhanced gradient magnitude values to form a wireframe image having enhanced edges of objects; and
displaying the wireframe image on a display device to the user, wherein the wireframe image appears as a decluttered line drawing where the enhanced edges have increased luminosity and contrast compared to the thermal image to reduce the cognitive load of the user.

8. The system of claim 7, wherein calculating gradient magnitude statistics further comprises: generating for each of the subregions a histogram of gradient magnitude values and cumulative gradient magnitude counts, and upper and lower gradient magnitude percentile values.

9. The system of claim 7, wherein calculating the mapping parameters, further comprises: determining the mapping parameters necessary to linearly map gradient magnitude value control points of each subregion to a predetermined reference gradient magnitude representing a desired dynamic range.

10. The system of claim 9, wherein calculating the mapping parameters, further comprises: determining an intercept and slope of the reference gradient magnitude and using the intercept and the slope to create the mapping parameters to apply to each pixel in the subregion.

11. The system of claim 10, wherein calculating the mapping parameters, further comprises: calculating the mapping parameters as:

$$x' = f(\alpha, \beta, x); \text{ and } f(\alpha, \rho, x) = \beta x + \alpha,$$

where x=a current pixel gradient magnitude value, $\alpha$=intercept, and $\beta$=slope, and x'=equalized pixel value.

12. The system of claim 7, wherein displaying the wireframe image on a display device further comprises: translating the enhanced gradient magnitude values from a perspective of a thermal camera that captures the thermal image to a viewing perspective of an eye of the user.

13. A non-transitory computer-readable medium containing program instructions for enhancing edges of objects in a thermal image, wherein the computer readable medium, a thermal camera that captures the thermal image, and a processor for processing the thermal image into a wireframe image in real-time, are worn by a user, the program instructions when executed by the processor for:
receiving the thermal image and generating a gradient magnitude image comprising a plurality of pixels having associated gradient magnitude values;
partitioning the gradient magnitude image into subregions;
calculating gradient magnitude statistics for each of the subregions;
calculating mapping parameters for each of the subregions to equalize and smooth a dynamic range of the corresponding gradient magnitude statistics across the subregions, and interpolating the mapping parameters as a function of computed distances to neighboring subregions to generate smoothed mapping parameters to compensate for arbitrary subregion boundaries, wherein interpolating the mapping parameters comprises:
defining a set of anchor points (wi) to be applied to all of the subregions;
for each pixel (p) in a respective subregion, calculating weights for each anchor point by calculating the distance between a current pixel and each of the anchor points; and
calculating the smoothed mapping parameters $\alpha$=intercept and $\beta$=slope for each pixel (p) in the respective subregion as a weighted sum of $\alpha$ and $\beta$ for the anchor points wi:

$$\alpha_p = \Sigma_{i=0}^{8} f(wi) * \alpha_i \text{ and } \beta_p = \Sigma_{i=0}^{8} f(wi) * \beta_i;$$

applying the mapping parameters calculated for each of the subregions to pixels in the corresponding subregions to generate enhanced gradient magnitude values having equalized luminosity and contrast, and using the enhanced gradient magnitude values to form a wireframe image having enhanced edges of objects; and
displaying the wireframe image on a display device to the user, wherein the wireframe image appears as a decluttered line drawing where the enhanced edges have increased luminosity and contrast compared to the thermal image to reduce the cognitive load of the user.

14. The non-transitory computer-readable medium of claim 13, wherein calculating gradient magnitude statistics further comprises: generating for each of the subregions a histogram of gradient magnitude values and cumulative gradient magnitude counts, and upper and lower gradient magnitude percentile values.

15. The non-transitory computer-readable medium of claim 13, wherein calculating the mapping parameters, further comprises: determining the mapping parameters necessary to linearly map gradient magnitude value control points of each subregion to a predetermined reference gradient magnitude representing a desired dynamic range.

16. The non-transitory computer-readable medium of claim 15, wherein calculating the mapping parameters, further comprises: determining an intercept and slope of the reference gradient magnitude and using the intercept and the slope to create the mapping parameters to apply to each pixel in the subregion.

17. The non-transitory computer-readable medium of claim 16, wherein calculating the mapping parameters, further comprises: calculating the mapping parameters as:

$$x'=f(\alpha,\beta,x); \text{ and } f(\alpha,\beta,x)=\beta x+\alpha,$$

where x=a current pixel gradient magnitude value, α=intercept, and β=slope, and x'=equalized pixel value.

18. The non-transitory computer-readable medium of claim 13, wherein displaying the wireframe image on a display device further comprises: translating the enhanced gradient magnitude values from a perspective of a thermal camera that captures the thermal image to a viewing perspective of an eye of the user.

19. A method for enhancing edges of objects in a thermal image to improve user vision and navigation in obscure environments, comprising:
   computing a gradient magnitude image from the thermal image, the gradient magnitude image comprising a plurality of gradient magnitude values;
   partitioning the gradient magnitude image into a plurality of non-overlapping subregions;
   for each of the subregions, calculating gradient magnitude statistics from the gradient magnitude values in the respective subregion;
   applying predetermined upper and lower bound gradient percentiles and an absolute minimum percentile for the gradient magnitude values across all the subregions;
   for each of the subregions, determining upper and lower gradient magnitude values at the upper and lower bound gradient percentiles, respectively;
   for each of the subregions, calculating mapping parameters to apply to the pixels in the respective subregion to linearly map the upper and lower gradient magnitude values to a predetermined reference gradient magnitude representing a desired dynamic range applied to all the subregions;
   for each of the pixels in each of the subregions, computing a distance to neighboring subregions and interpolating the mapping parameters generated for the respective subregion as a function of the computed distances to generate smoothed mapping parameters;
   applying the smoothed mapping parameters to the pixels in the gradient magnitude image to generate a wireframe image; and
   displaying the wireframe images in a line of sight of an eye of a user, wherein the wireframe image appears as a decluttered line drawing where edges have increased luminosity and contrast compared to the thermal image.

20. The method of claim 19, further comprising: performing the method of enhancing the edges of objects in a platform, comprising:
   a thermal camera worn by the user to capture thermal images;
   one or more processors in communication with the thermal camera, wherein the one or more processors execute an edge enhancement engine that processes the thermal images in real time into wireframe images; and
   a display unit worn in the line of sight of of the user that displays the wireframe images, the display unit comprising one of an augmented reality (AR) display unit, a virtual reality (VR) display unit, or a head-mounted projection display unit.

21. The method of claim 20, further comprising: displaying the wireframe image in a command and control interface on a display device to a person of authority.

* * * * *